United States Patent
Wigard et al.

(10) Patent No.: US 11,310,706 B2
(45) Date of Patent: Apr. 19, 2022

(54) RADIO LINK SETUP SIGNALING IN CELLULAR SYSTEM

(71) Applicant: Nokia Technologies Oy, Espoo (FI)

(72) Inventors: Jeroen Wigard, Klarup (DK); István Zsolt Kovacs, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/975,477

(22) PCT Filed: Mar. 2, 2018

(86) PCT No.: PCT/FI2018/050153
§ 371 (c)(1),
(2) Date: Aug. 25, 2020

(87) PCT Pub. No.: WO2019/166686
PCT Pub. Date: Sep. 6, 2019

(65) Prior Publication Data
US 2021/0029598 A1    Jan. 28, 2021

(51) Int. Cl.
*H04W 36/00* (2009.01)
*H04B 7/185* (2006.01)
*H04W 36/32* (2009.01)

(52) U.S. Cl.
CPC .. *H04W 36/00835* (2018.08); *H04B 7/18541* (2013.01); *H04W 36/0077* (2013.01); *H04W 36/32* (2013.01)

(58) Field of Classification Search
None
See application file for complete search history.

(56) References Cited

U.S. PATENT DOCUMENTS

| 5,678,184 | A | 10/1997 | Cutler, Jr. et al. |
| 6,138,021 | A | 10/2000 | Arrington, Jr. et al. |
| 6,321,088 | B1 | 11/2001 | Dempo |
| 2006/0009253 | A1* | 1/2006 | Nielsen ............... H04W 36/14 455/552.1 |
| 2016/0192255 | A1* | 6/2016 | Tsuda .................. H04W 88/00 370/331 |
| 2019/0110212 | A1* | 4/2019 | Tang .................... H04W 8/08 |
| 2019/0387440 | A1* | 12/2019 | Yiu ................... H04W 36/0072 |
| 2020/0154326 | A1* | 5/2020 | Deenoo ............... H04W 24/08 |

(Continued)

FOREIGN PATENT DOCUMENTS

| WO | 02/11302 A2 | 2/2002 |
| WO | 2015/127987 A1 | 9/2015 |

OTHER PUBLICATIONS

Office action received for corresponding Indian Patent Application No. 202047040923, dated Aug. 16, 2021, 7 pages.

(Continued)

*Primary Examiner* — Kodzovi Acolatse
(74) *Attorney, Agent, or Firm* — Harrington & Smith (57) ABSTRACT

This document discloses a solution for providing a terminal device with one or more candidate cells for link setup. A network node providing the candidate cell(s) may compute a validity window for each candidate cell and indicate the validity window(s) to the terminal device. The terminal device may then perform the link setup with a candidate cell within the respective validity window of the candidate cell.

18 Claims, 5 Drawing Sheets

(56) References Cited

U.S. PATENT DOCUMENTS

2020/0187069 A1* 6/2020 Hong .................... H04W 36/36
2021/0235336 A1* 7/2021 Martin .............. H04W 36/0061

OTHER PUBLICATIONS

"3rd Generation Partnership Project; Technical Specification Group Radio Access Network; Study on New Radio (NR) to support non terrestrial networks (Release 15)", 3GPP TR 38.811, V0.2.1, Nov. 2017, pp. 1-44.

"3rd Generation Partnership Project; Technical Specification Group Radio Access Network; Study on Enhanced LTE Support for Aerial Vehicles (Release 15)", 3GPP TR 36.777, V1.0.0, Dec. 2017, 151 pages.

Barbera et al., "Synchronized RACH-less Handover Solution for LTE Heterogeneous Networks", International Symposium on Wireless Communication Systems (ISWCS), 2015, 5 pages.

Gimenez et al., "UE Autonomous Cell Management in a High-Speed Scenario with Dual Connectivity", IEEE 27th Annual International Symposium on Personal, Indoor, and Mobile Radio Communications (PIMRC), 2016, 6 pages.

"Conditional Handover", 3GPP TSG-RAN WG2 NR Ad Hoc, Tdoc R2-1700544, Agenda : 3.3.1.1.2, Ericsson, Jan. 17-19, 2017, pp. 1-4.

"Field Trial Results on Handover Performance for Aerial Vehicles", 3GPP TSG-RAN WG2 Meeting #99, R2-1708237, Agenda : 9.4.4, Qualcomm Incorporated, Aug. 21-25, 2017, 3 pages.

International Search Report and Written Opinion received for corresponding Patent Cooperation Treaty Application No. PCT/FI2018/050153, dated Jun. 11, 2018, 12 pages.

* cited by examiner

RADIO LINK SETUP SIGNALING IN CELLULAR SYSTEM

RELATED APPLICATION

This application was originally filed as PCT Application No. PCT/FI2018/050153, filed on Mar. 2, 2018.

FIELD

Various embodiments described herein relate to radio link setup signaling in a cellular communication system.

BACKGROUND

Radio link setup includes setting up a radio link between a terminal device and an access node of the wireless network, e.g. a cellular communication system. The access node may be a base station, sometimes called a Node B or evolved Node B in specifications of the cellular communication systems. The cellular communication system may employ access nodes that are stationary, so-called terrestrial access nodes. The cellular communication system may also employ non-terrestrial access nodes that are mobile and provided in a satellite or another aerial platform. The radio link setup may establish a radio resource control connection between the access node and the terminal device, and the radio link setup may be related to a handover, an initial radio link setup, or adding a new radio link amongst existing one or more radio links of the terminal device.

BRIEF DESCRIPTION OF THE INVENTION

The invention is defined by the subject-matter of the independent claims. Embodiments are defined in the dependent claims.

According to an aspect, there is provided a method comprising: selecting, by a network node of a cellular communication system, for a terminal device, at least one candidate cell for link setup; determining, by the network node, a validity window for the at least one candidate cell, the validity window defining a time window when the link setup with the candidate cell will be valid for the terminal device; and transmitting, by the network node to the terminal device, a message comprising at least one information element indicating the at least one candidate cell and the corresponding validity window.

In an embodiment, the network node determines the validity window on the basis of the mobility of the terminal device.

In an embodiment, at least one of the network node and the candidate cell is mobile, and the network node determines the validity window for the candidate cell on the basis of the mobility of the at least one of the network node and the candidate cell.

In an embodiment, the mobility comprises at least one of direction of movement, location and velocity.

In an embodiment, the method further comprises before transmitting the message to the terminal device: transferring at least one current connection parameter of the terminal device to the at least one candidate cell to prepare the at least one candidate cell for the link setup.

In an embodiment, the method further comprises receiving, by the network node, a message comprising at least one information element indicating which one of the at least one candidate cell the terminal device selected for the link setup.

In an embodiment, the method further comprises verifying, by the network node before selecting the at least one candidate cell, whether or not the at least one candidate cell is prepared for the link setup.

In an embodiment, the message is a handover command or a command for setting up an additional radio link for the terminal device.

According to another aspect, there is provided a method comprising: receiving, in a terminal device of a cellular communication system, a message from a network node of the cellular communication system, the message comprising at least one information element indicating at least one candidate cell and a validity window for the at least one candidate cell, the validity window defining a time window when link setup with the cell will be valid for the terminal device; selecting, in the terminal device, one of the at least one candidate cell for the link setup; and initiating, by the terminal device, the link setup with the candidate cell within the validity window associated with the selected candidate cell.

In an embodiment, the method comprises: performing the selection before the validity window associated with the selected candidate cell starts.

In an embodiment, the method comprises performing the selection after the validity window associated with the selected candidate cell has started.

In an embodiment, the at least one candidate cell comprises a plurality of candidate cells, and the method further comprises before said selecting: comparing by the terminal device validity windows of the plurality of candidate cells and selecting the candidate cell on the basis of the comparison.

In an embodiment, the method further comprises measuring, by the terminal device a reference signal received from each of the plurality of candidate cells and using the measurements in the comparison.

In an embodiment, the method further comprises selecting, by the terminal device according to at least one determined criterion, a particular time instance for the triggering the link setup within the validity window associated with the selected candidate cell, wherein the at least one criterion is based on measurements made by the terminal device or a state of the terminal device.

According to another aspect, there is provided an apparatus comprising means for carrying out all the steps of any one of the above-described methods.

According to an aspect, there is provided a computer program product readable by a computer and, when executed by the computer, configured to cause the computer to execute a computer process comprising all the steps of any one of the above-described methods.

According to another aspect, there is provided an apparatus comprising at least one processor and at least one memory including a computer program code, wherein the at least one memory and the computer program code are configured, with the at least one processor, to cause the apparatus to: select for a terminal device of a cellular communication system, at least one candidate cell for link setup; determine a validity window for the at least one candidate cell, the validity window defining a time window when the link setup with the candidate cell will be valid for the terminal device; and cause transmission of a message to the terminal device, the message comprising at least one information element indicating the at least one candidate cell and the corresponding validity window.

In an embodiment, the at least one memory and the computer program code are configured, with the at least one processor, to cause the apparatus to determine the validity window on the basis of the mobility of the terminal device.

In an embodiment, at least one of the apparatus and the candidate cell is mobile, and wherein the at least one memory and the computer program code are configured, with the at least one processor, to cause the apparatus to determine the validity window for the candidate cell on the basis of the mobility of the at least one of the apparatus and the candidate cell.

In an embodiment, the mobility comprises at least one of direction of movement, location and velocity.

In an embodiment, the at least one memory and the computer program code are configured, with the at least one processor, to cause the apparatus to transfer, before transmitting the message to the terminal device, at least one current connection parameter of the terminal device to the at least one candidate cell to prepare the at least one candidate cell for the link setup.

In an embodiment, the at least one memory and the computer program code are configured, with the at least one processor, to cause the apparatus to receive a message comprising at least one information element indicating which one of the at least one candidate cell the terminal device selected for the link setup.

In an embodiment, the at least one memory and the computer program code are configured, with the at least one processor, to cause the apparatus to verify, before selecting the at least one candidate cell, whether or not the at least one candidate cell is prepared for the link setup.

In an embodiment, the message is a handover command or a command for setting up an additional radio link for the terminal device.

According to another aspect, there is provided an apparatus comprising at least one processor and at least one memory including a computer program code, wherein the at least one memory and the computer program code are configured, with the at least one processor, to cause the apparatus to: receive a message from a network node of a cellular communication system, the message comprising at least one information element indicating at least one candidate cell and a validity window for the at least one candidate cell, the validity window defining a time window when link setup with the cell will be valid for the apparatus; select one of the at least one candidate cell for the link setup; and initiate the link setup with the selected candidate cell within the validity window associated with the selected candidate cell.

In an embodiment, the at least one memory and the computer program code are configured, with the at least one processor, to cause the apparatus to perform the selection before the validity window associated with the selected candidate cell starts.

In an embodiment, the at least one memory and the computer program code are configured, with the at least one processor, to cause the apparatus to perform the selection after the validity window associated with the selected candidate cell has started.

In an embodiment, the at least one candidate cell comprises a plurality of candidate cells, and wherein the at least one memory and the computer program code are configured, with the at least one processor, to cause the apparatus to compare, before said selecting, validity windows of the plurality of candidate cells and to select the candidate cell on the basis of the comparison.

In an embodiment, the at least one memory and the computer program code are configured, with the at least one processor, to cause the apparatus to measure a reference signal received from each of the plurality of candidate cells and to use the measurements in the comparison.

In an embodiment, the at least one memory and the computer program code are configured, with the at least one processor, to cause the apparatus to select, according to at least one determined criterion, a particular time instance for the triggering the link setup within the validity window associated with the selected candidate cell, wherein the at least one criterion is based on measurements or a state of the apparatus.

LIST OF DRAWINGS

In the following, the invention will be described in greater detail with reference to the embodiments and the accompanying drawings, in which.

DESCRIPTION OF EMBODIMENTS

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Embodiments described may be implemented in a cellular communication system, such as in at least one of the following: Global System for Mobile Communications (GSM) or any other second generation cellular communication system, Universal Mobile Telecommunication System (UMTS, 3G) based on basic wideband-code division multiple access (W-CDMA), high-speed packet access (HSPA), Long Term Evolution (LTE), LTE-Advanced, a system based on IEEE 802.11 specifications, a system based on IEEE 802.15 specifications, and/or a fifth generation (5G) mobile or cellular communication system The embodiments are not, however, restricted to the system given as an example but a person skilled in the art may apply the solution to other communication systems provided with necessary properties. One example of a suitable communications system is the 5G system, as listed above. 5G has been envisaged to use multiple-input-multiple-output (MIMO) multi-antenna transmission techniques, more base stations or nodes than the current network deployments of LTE, by using a so-called small cell concept including macro sites operating in co-operation with smaller local area access nodes and perhaps also employing a variety of radio technologies for better coverage and enhanced data rates. 5G will likely be comprised of more than one radio access technology (RAT), each optimized for certain use cases and/or spectrum. 5G system may also incorporate both cellular (3GPP) and non-cellular (e.g. IEEE) technologies. 5G mobile communications will have a wider range of use cases and related applications including video streaming, augmented reality, different ways of data sharing and various forms of machine type applications, including vehicular safety, different sensors and real-time control. 5G is expected to have multiple radio interfaces, including apart from earlier deployed frequencies below 6 GHz, also higher, that is cmWave and mmWave frequencies, and also being capable of integrating with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as inter-RI operability between cmWave and mmWave). One of the concepts considered to be used in 5G networks is network slicing in which multiple independent and dedicated virtual sub-networks (network instances) may be created within the same infrastructure to run services that have different requirements on latency, reliability, throughput and mobility.

It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or cloud data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent. Some other technology advancements probably to be used are Software-Defined Networking (SDN), Big Data, and all-IP, which may change the way networks are being constructed and managed.

Figure 1:
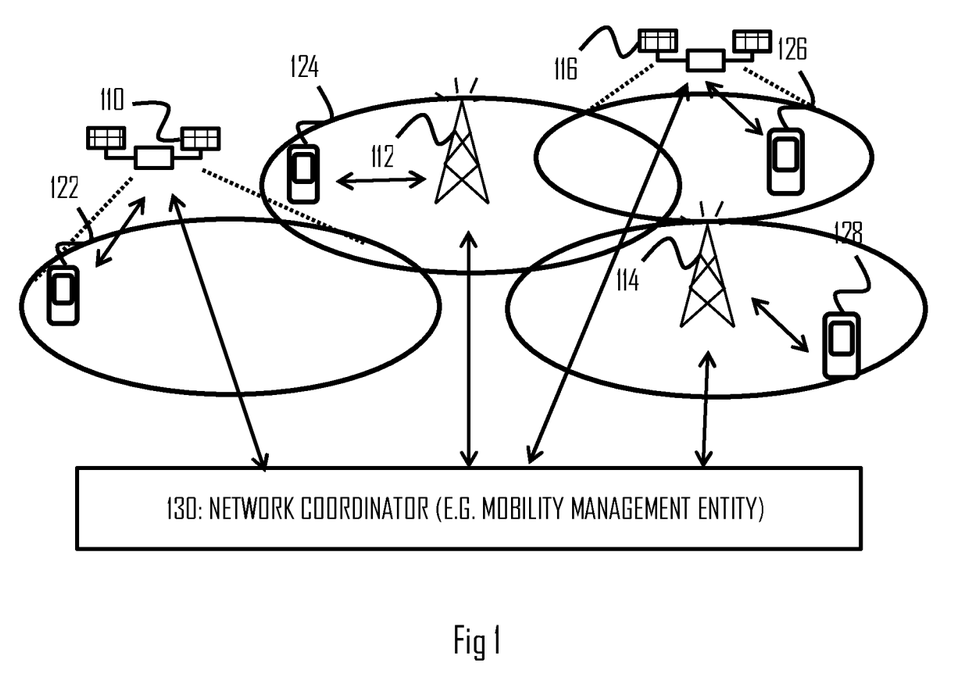
FIG. 1 illustrates a wireless access network to which embodiments of the invention may be applied.

FIG. 1 illustrates an example of a cellular communication system to which some embodiments of the invention may be applied. The system may comprise access nodes 110, 112, 114, 116 providing and managing respective cells. A cell may be a macro cell, a micro cell, femto cell, or a pico cell, for example. From another point of view, the cell may define a coverage area or a service area of the access node. The access nodes 110 to 116 may each be an evolved Node B (eNB) as in the LTE and LTE-A, an access node of a 5G network, an access point of an IEEE 802.11-based network (Wi-Fi or wireless local area network, WLAN), or any other apparatus capable of controlling radio communication and managing radio resources within a cell. For 5G solutions, the implementation may be similar to LTE-A, as described above. The access node may equally be called a base station or a network node. The system may be a wireless communication system composed of a radio access network of access nodes, each controlling a respective cell or cells. The access nodes may provide terminal devices (UEs) 122, 124, 126, 128 with wireless access to other networks such as the Internet. The terminal device may also be called a station.

The access nodes 110 to 116 may include terrestrial access nodes 112, 114 that are stationary and fixed to a certain location on the ground. The access nodes 110 to 116 may also include non-terrestrial access nodes 110, 116 that are not physically locate on the ground. Such access nodes may be provided in a satellite or another aerial device. The non-terrestrial access nodes 110, 116 may be stationary such as geostationary satellites or mobile. The non-terrestrial access nodes may be configured to provide one or more logically unique cells. In some embodiments, at least some of the non-terrestrial access nodes may operate as a repeater for one or more terrestrial cells (so-called bent pipe concept).

The number of access nodes in the system may be very high, e.g. from hundreds to tens of thousands of access nodes, which is typical for operators providing services throughout a country or a state. In the case of multiple access nodes in the communication network, the access nodes may be connected to each other with an interface. LTE specifications call such an interface as X2 interface. In IEEE 802.11 networks, a similar interface may be provided between access points. An LTE access node and a WLAN access node may be connected, for example via Xw interface. Other wired or wireless communication methods between the access nodes may also be possible. The access nodes may be further connected via another interface to a core network of the cellular communication system. The LTE specifications specify the core network as an evolved packet core (EPC), and the core network may comprise a mobility management entity (MME) and a gateway (GW) node. In FIG. 1, such network nodes are illustrated by a network coordinator 130 connected to the access nodes. In the LTE system, the GW may be a serving gateway (S-GW) or a packet data network gateway (P-GW). The MME may handle mobility of terminal devices in a tracking area encompassing a plurality of cells and also handle signalling connections between the terminal devices and the core network. The MME may further carry out authentication and integrity protection for terminal devices. The gateway node may handle data routing in the core network and to/from the terminal devices.

The core network and a radio network of access nodes may form a wireless access network providing the terminal devices 122 to 128 with wireless access and data transfer capability with the other networks. In order to provide the wireless access, the wireless access network may first establish a radio link with the terminal device. The radio link establishment may include establishment of a radio connection such as a radio resource control (RRC) connection between the access node and the terminal device and, furthermore, it may include establishment of a core network connection between the core network and the terminal device. The radio link setup may be understood as creating an association between the terminal device and the access node. The radio link setup may include authentication of the terminal device. The authentication may be performed by the MME, a dedicated authentication server or, in general, any network node of the wireless access network capable of performing the authentication. A terminal device that has an association such as a RRC connection with the access node may be configured for data transfer with the access node and the other networks.

The mobile scenario where not only the terminal device but also the access nodes are mobile poses challenges to providing the terminal device with seamless radio access.

Figure 2:
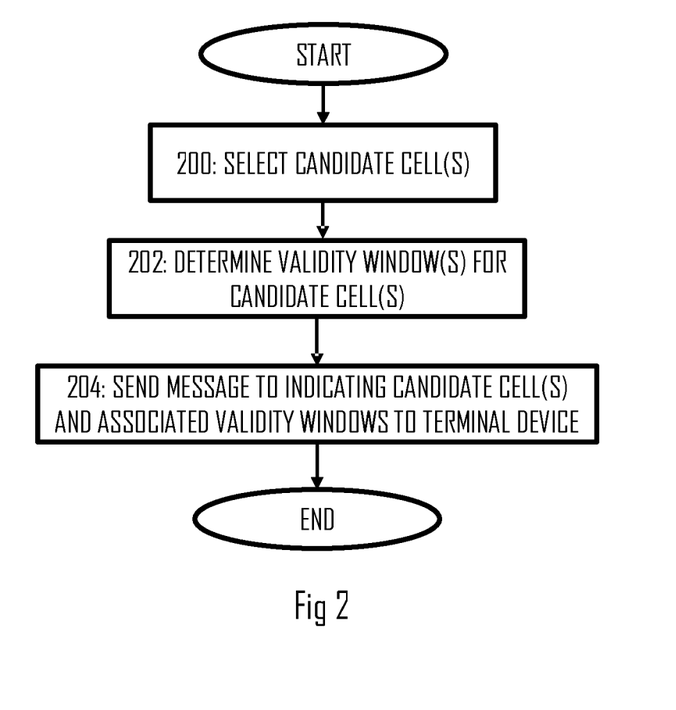
FIG. 2 illustrates a process for providing a terminal device with a candidate list of cells for radio link setup according to an embodiment of the invention.
Figure 3:
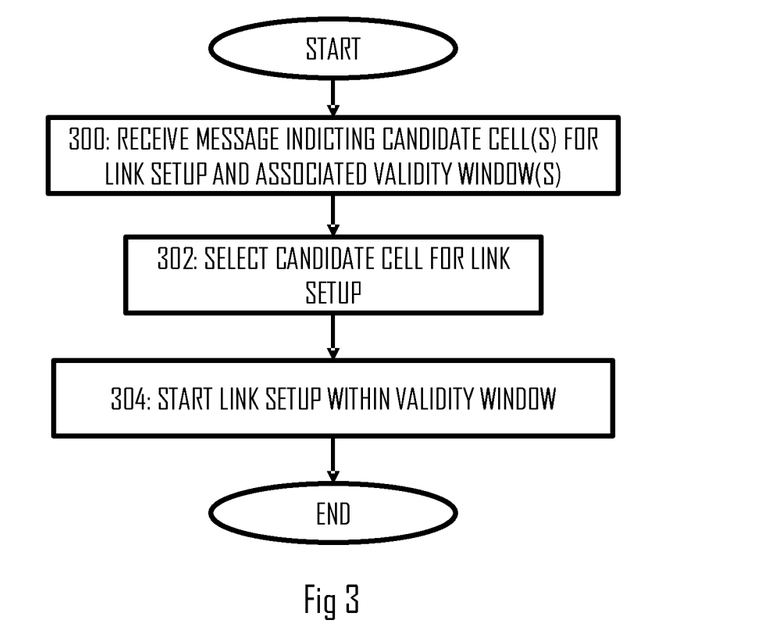
FIG. 3 illustrate a process for using a candidate list of cells for radio link setup in a terminal device according to an embodiment of the invention.

FIGS. 2 and 3 illustrate some embodiments for improving reliability to the provision of the radio access. FIG. 2 illustrates a signalling diagram for a process carried out in a network node such as an access node, e.g. an access node currently serving the terminal device. FIG. 3 illustrates a corresponding process in the terminal device.

Referring to FIG. 2, the process comprises as performed by the network node: selecting for a terminal device at least one candidate cell for link setup (block 200); determining a validity window for the at least one candidate cell, the validity window defining a time window when the link setup with the candidate cell will be valid for the terminal device (block 202); and transmitting to the terminal device a message comprising at least one information element indicating the at least one candidate cell and the corresponding validity window (block 204).

Referring to FIG. 3, the process comprises as performed by the terminal device: receiving a message from a network node, the message comprising at least one information element indicating at least one candidate cell and a validity window for the at least one candidate cell, the validity window defining a time window when link setup with the cell will be valid for the terminal device (block 300); selecting one of the at least one candidate cell for the link setup (block 302); and initiating the link setup within the validity window associated with the selected candidate cell (block 304).

The embodiments described above estimate a validity window for the link setup and, thus, provide the terminal device with information when and for how long the link setup will be possible. The terminal device may then use this information in selection of the candidate cell for the link setup and for performing the link setup within the validity window. This reduces the probability for radio link failures in mobile environment, in particular where the terminal device and at least some of the candidate cells are mobile.

In an embodiment, the validity window provides an estimate of a time interval when the terminal device will be in a service area of a respective candidate cell. In another embodiment, the validity window defines a sub-interval within the time interval when the terminal device will be in the service area of the respective candidate cell. The sub-interval may be shorter than the time interval.

In an embodiment, the message transmitted in block 204 and received in block 300 is a handover command message, and the terminal device uses the information on the candidate cells and the associated validity windows when performing a handover. In such a case, the network node performing the process of FIG. 2 may be a source access node for the handover, and the candidate cells may be candidates for a target cell of the handover.

In an embodiment, the message transmitted in block 204 and received in block 300 is a multi-connectivity command message, and the terminal device uses the information on the candidate cells and the associated validity windows when adding a new radio link that is additional to at least one radio link operational between the cellular communication system and the terminal device.

In an embodiment, the network node executing the process of FIG. 2 is an access node. In an embodiment, the access node is a mobile access node.

In an embodiment, upon detecting the expiry of a validity window, the terminal device may be prohibited from attempting the link setup with the respective access node.

In an embodiment, the network node may use at least some of the following information when computing the validity windows for a candidate cell: mobility of the candidate cell, mobility of the terminal device, mobility of the network node, and coverage area of the candidate cell. The mobility of the terminal device may include one or more of the following mobility parameters: a location of the terminal device, direction of movement of the terminal device and velocity of the terminal device. Velocity may be scalar or vector quantity and it may include speed or both speed and direction of the terminal device. The mobility of the candidate cell may include one or more of the following mobility parameters: a location of the candidate cell, direction of movement of the terminal device and the velocity of the candidate cell. The mobility of the network node may include one or more of the following mobility parameters: a location of the network node, direction of movement of the netwoek node and the velocity of the network node. The network node may acquire at least some of the mobility information through radio measurements and/or through communication. For example, the candidate cell may provide the network node with information on its coverage area and velocity.

In an embodiment, the network node may compute the validity window on the basis of an estimate of a time interval the terminal device will be in a coverage area of the candidate cell. The validity window may be indicated by using a start time and an end time of the validity window or by indicating the start time and duration of the validity window.

Figure 4:
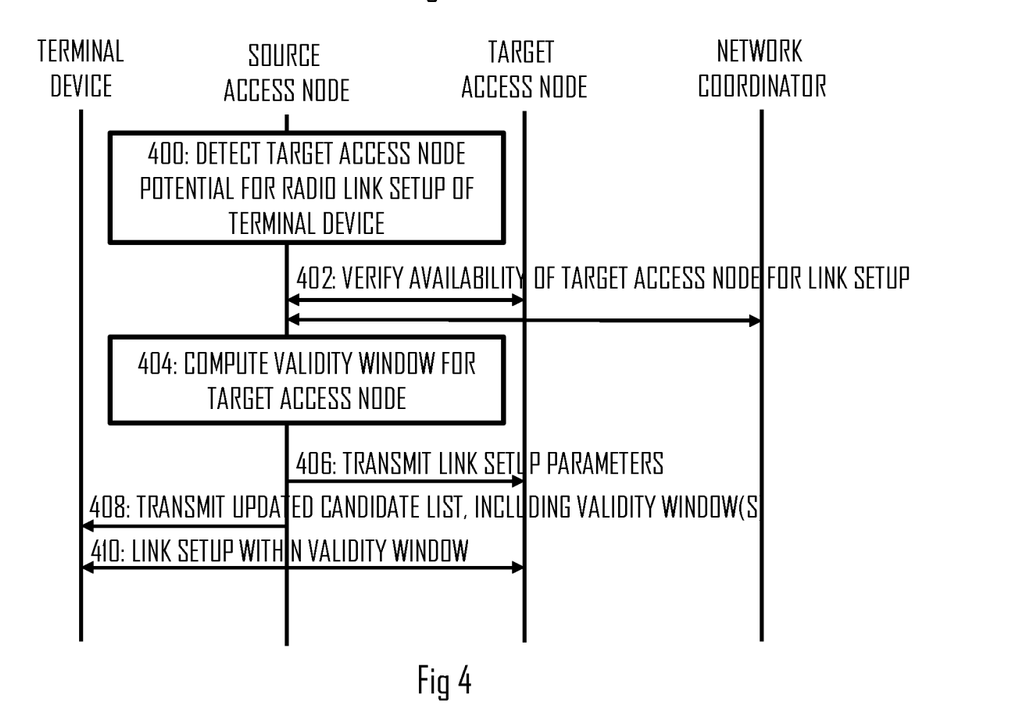
FIG. 4 illustrates a signaling diagram of a process for employing a candidate cell list according to an embodiment of the invention.

Let us now describe an embodiment of FIGS. 2 and 3 with reference to a signaling diagram of FIG. 4. FIG. 4 illustrates the process in the context of the handover, but the embodiment is directly applicable to the addition of a new radio link in multi-connectivity of the terminal device. Referring to FIG. 4, the network node (the source access node in this embodiment) detects a target access node in block 400, e.g. through radio measurements, through internal signaling between the source and target access node, or through known trajectories of the access nodes stored in the source access node beforehand.

Upon detecting the target access node, the source access node may verify the availability of the target access node for the link setup (step 402). The source access node may perform the verification by communicating directly with the target access node or through the network coordinator in the embodiments described below. The verification may include requesting the target access node to indicate whether or not it may provide a new radio link. The verification may include the source access node transmitting an identifier and capability information of the terminal device to the target access node. The capability information may include traffic demand, latency requirement, or one or more other quality of service (QoS) requirements of the terminal device, for example. The target access node may then consider its current capacity in view of the traffic demand. Upon detecting that the target access node cannot provide another radio link, the process may end. However, let us assume that the target access node is capable of providing the radio link and, upon receiving the verification from the network coordinator or the target access node, the source access node may compute the validity window for the radio link between the terminal device and the target access node (block 404).

In an embodiment, the source access node may estimate the validity window before performing the verification. The verification may then include transmitting the validity window of the target access node to the target access node. The target access node may then use the validity window in the estimation of its capability to add a new link. For example, if the target access node detects that several new links are proposed for a determined time instant in the near future, indicated in the form of overlapping validity windows, the target access may estimate that its capacity will not be sufficient. Accordingly, it may refuse adding some of the proposed new links.

Upon computing the validity window, the source access node may transmit the message indicating a candidate cell of the target access node and the associated validity window to the terminal device (step 408). Before or directly after step 408, the source access node may indicate at least one parameter related to the link setup to the target access node. The at least one parameter may include an identifier of the terminal device and, optionally, some connection parameters of a current connection between the cellular communication system and the terminal device. The connection parameters may include at least one identifier of a bearer service associated with the terminal device, e.g. for use when aggregating multiple radio links of the terminal device.

As indicated in FIG. 4, the message transferred in step 408 may comprise an updated candidate cell list, indicating a cell of the target access node and associated validity window. Upon receiving the message in step 408 from the source access node, the terminal device may select the candidate cell of the target access node and initiate link setup with the target access node in step 410. Step 410 may be carried out by using state-of-the-art link setup methods except for that the terminal device initiates the timing of the link setup such that the link setup is performed within the validity window, e.g. only within the validity window.

In an embodiment, the selection of the candidate cell is performed before the validity window of the candidate cell starts. In this manner, the terminal device may prepare for the link setup even before the validity window. In an embodiment, at least one function of the link setup is performed before the validity window. The at least one function may comprise indicating the selected candidate cell to the source access node, generating a link setup message in the terminal device, or another preliminary function.

Upon receiving an indication of the selected candidate cell, the source access node may prepare for a release of a radio link of the terminal device in a handover scenario. In a multi-connectivity scenario, the network node may use the information on the selected candidate cell for link multiplexing towards the core network, for example.

In an embodiment, the network node may compute the validity window only for a single target cell of handover and, then, send a handover command to the terminal device. The handover command may identify the target cell of handover and the validity window for the target cell. The handover command may trigger the terminal device to start handover link setup with the target cell within the validity window.

Figure 5:
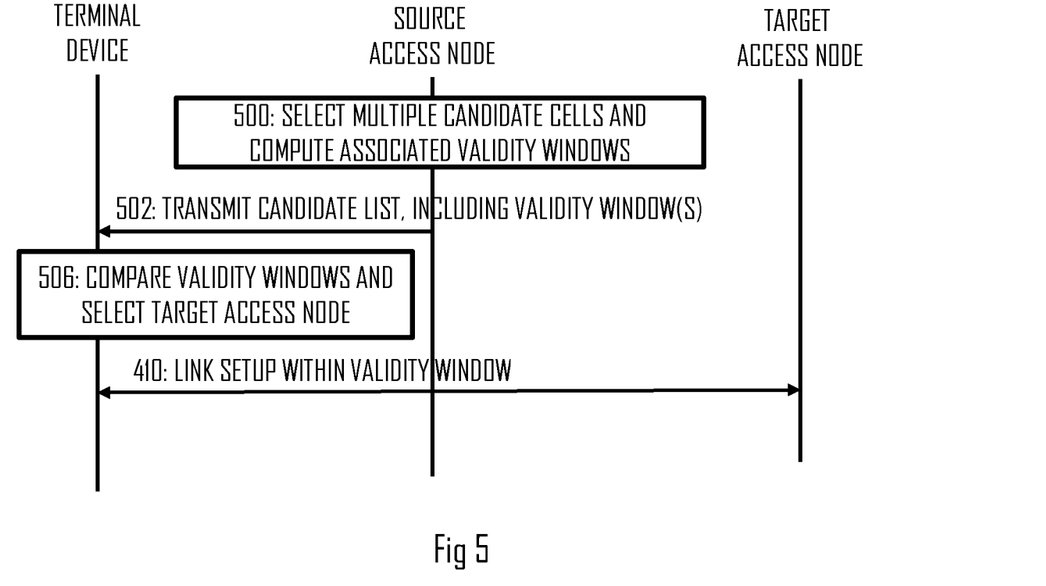
FIGS. 5 and 6 illustrate embodiments for performing cell selection for radio link setup according to some embodiments of the invention.

In an embodiment, the network node may compute the validity window for a plurality of candidate cells and indicate to the terminal device the plurality of candidate cells and associated validity windows. FIG. 5 illustrates such an embodiment. FIG. 5 is described in the context of handover but it is directly applicable to the multi-connectivity as well.

Referring to FIG. 5, the source access node detects the plurality of candidate cells as candidates for the link setup for the terminal device, and computes the validity window for each candidate cell in block 500. Upon computing the validity windows, the source access node may transmit the candidate list indicating the plurality of candidate cells and associated validity windows to the terminal device (step 502). The indication of a candidate cell may be carried out by adding an identifier of the candidate cell to the candidate list. The candidate list may additionally include link setup parameters, e.g. one or more of handover parameters of the candidate cells, carrier frequency/frequencies of the candidate cells, frequency priority in case of multiple carrier frequencies, candidate cell priorities for the selection, and channel quality conditions with the candidate cells as measured by the source access node. Upon receiving the candidate list, the terminal device may extract the candidate cells from the candidate list and associated validity windows and start the cell selection in block 506. The cell selection may include comparison of the validity windows of the candidate cells.

In an embodiment where the validity window correlates or is associated with the time interval the terminal device is within the service area of the candidate cell, the terminal device selects the candidate cell associated with the longest validity window. In this manner, the terminal device may maintain the new radio link for a longer duration without a need for another handover. It also reduces signaling overhead in the system.

In an embodiment, the terminal device uses other criteria in addition to the validity windows in block 506, e.g. capacity or throughput requirement of the terminal device. For example, the link setup parameters may indicate a capacity estimate of each candidate cell. As a consequence, the terminal device may select the candidate cell on the basis of both the validity windows and link setup parameters. When the terminal device requires high capacity, the terminal device may prioritize the capacity provided by the candidate cells over the duration of the validity window. For example, the terminal device may prefer a candidate cell providing higher capacity even at the cost of shorter validity window. On the other hand, upon having no requirements for the capacity, the terminal device may prioritize the validity window over the link setup parameters. In all cases, the terminal device may still be required to perform the link setup within the validity window of the selected candidate cell.

Figure 6:
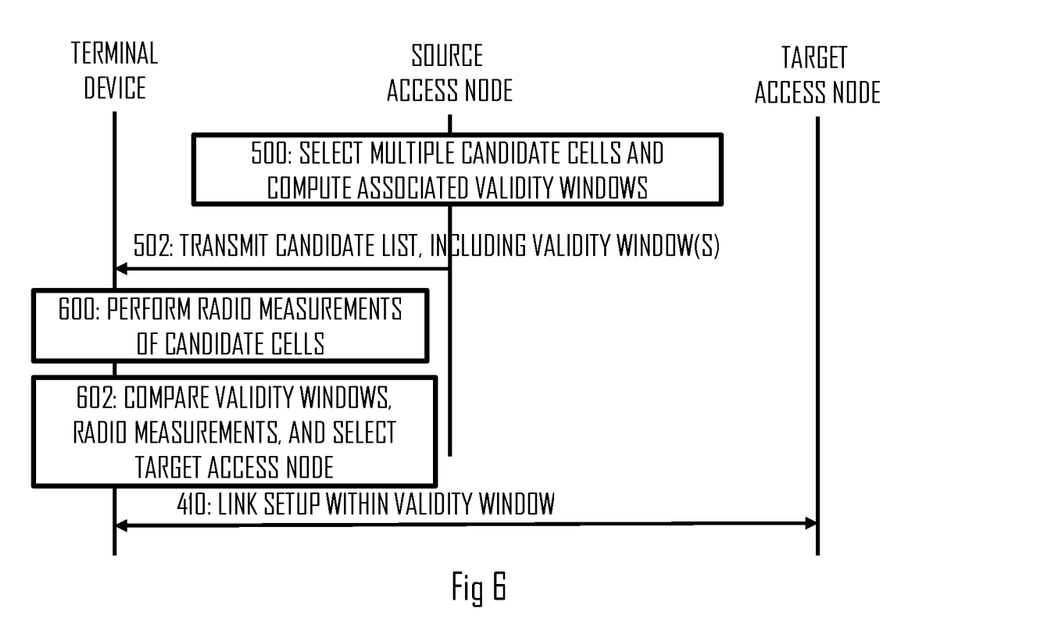

FIG. 6 illustrates yet another embodiment for selecting one of the candidate cells by the terminal device. In the embodiment of FIG. 6, the terminal device performs radio measurements for the candidate cells. The terminal device may measure a channel quality between the terminal device and each candidate cell and select the candidate cell on the basis of the measured channel qualities. In an embodiment, the channel quality is represented by a metric measured or derivable from a reference signal received power (RSRP), a reference signal received quality (RSRQ), signal-to-interference-power ratio (SNR), or another signal quality metric based on reference signal measurements. The reference signal may be a common reference signal or a dedicated reference signal, e.g. a dedicated demodulation reference signal or a channel state information reference signal.

Referring to FIG. 6, the steps denoted by the same reference numbers as in FIG. 5 represent the same or substantially similar operations. Upon receiving the list of candidate cells in step 502, the terminal device may perform the radio measurements or retrieve previously made radio measurement results for the candidate cells (block 600). In block 602, the terminal device compares the measurement results and the validity windows of the different candidate cells and selects one of the candidate cells on the basis of the comparison. The terminal device may further consider traffic demand of the terminal device in the comparison.

In an embodiment, the terminal device may prioritize the channel quality indicated by the measurement results, e.g. when the terminal device needs higher capacity or throughput.

In an embodiment, the terminal device prioritizes the validity windows over the radio measurements, e.g. when the traffic demand is low.

In an embodiment, the terminal device starts the link setup when the validity window starts.

In another embodiment, the terminal device selects a time instant within the validity window. In this embodiment, the terminal device may select any time instant within the validity window, e.g. a time instant when a certain criterion in the terminal device for the link setup is fulfilled. Fulfilling the criterion may be evaluated by performing measurements and/or by evaluating a state of the terminal device. As an example, the terminal device may select a suitable time instance within the validity window based on its traffic requirements.

Figure 7:
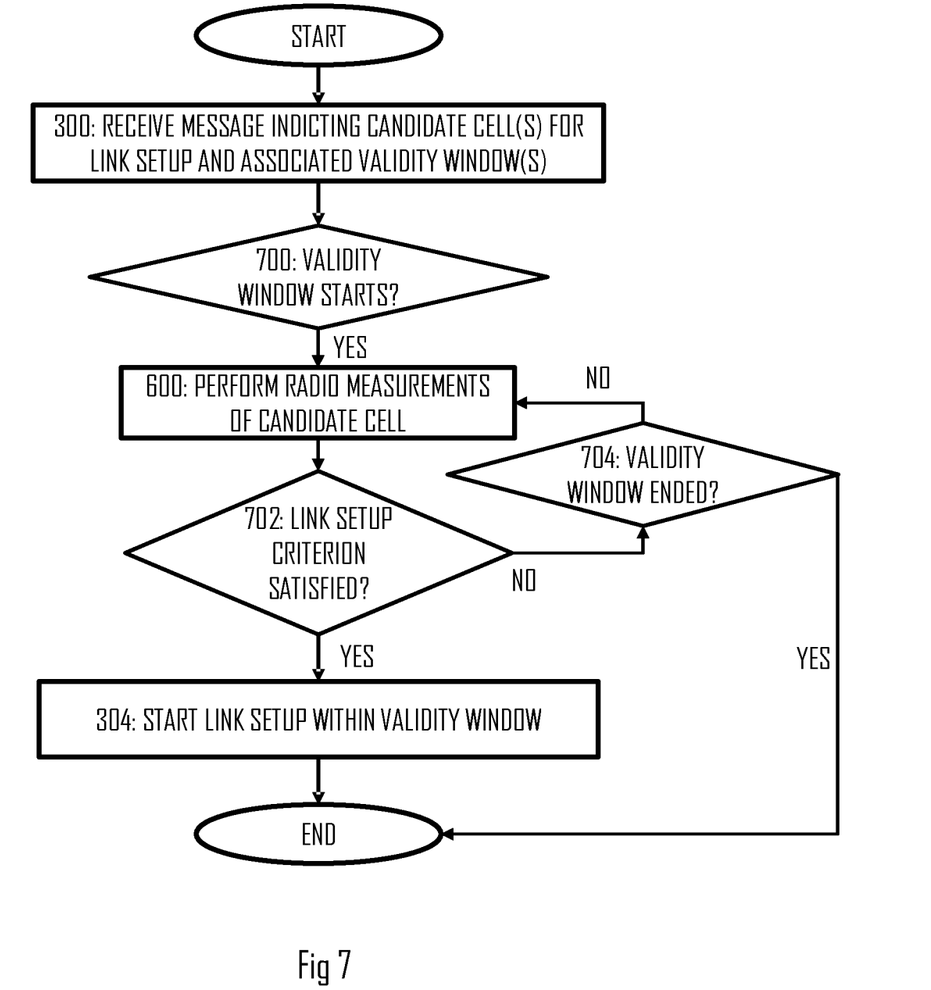
FIG. 7 illustrates a procedure for selecting a cell for link setup during a validity window of the cell.

FIG. 7 illustrates an example embodiment for selecting a time instant for the link setup within the validity window. Upon receiving the candidate cell or the list of candidate cells, the terminal device acquires the validity window(s) for the candidate cell(s). The validity window may indicate the time interval when the terminal device is within the service area of the respective candidate cell or the sub-interval of that time interval. Referring to FIG. 7, upon detecting in block 700 that the validity window for a candidate cell starts, the terminal device may start performing radio measurements for the candidate cell (block 600) and monitoring the fulfilling of at least one criterion for triggering the link setup. Upon detecting in block 702 that the criterion or criteria for triggering the link setup has been fulfilled, the terminal device may start the link establishment. While performing the measurements and the monitoring, the terminal device may also monitor for the expiry of the validity window (block 704). Upon expiry of the validity window, the procedure ends for that candidate cell. In an embodiment, the terminal device may end the procedure even before the expiry of the validity window. In the embodiments where the validity window corresponds to the time interval the terminal device is within the service area, it may not be feasible to perform the link setup close to the expiry of the validity window because the service time in the candidate cell would become short. A time instant before the expiry may be defined when the radio measurements and the monitoring end.

The terminal device may perform blocks 700 to 704 and 600 for multiple candidate cells in parallel, depending on the timings of the respective validity windows. Upon detecting that link setup criterion in block 702 is fulfilled in any one of the parallel processes, the terminal device may trigger the link setup and, depending on the embodiment, continue or terminate the other parallel processes.

Embodiments described above are applicable to a mode where the terminal device is in a connected state with the cellular communication system, e.g. a radio resource control (RRC) connected state. The embodiments are also directly applicable to a state where the terminal device has a control channel connection with the cellular communication system but is not actively transferring data. Such a state may be called inactive state. At least some embodiments are also applicable to an idle state of the terminal device where no control channel connection is present. In the idle state, embodiments described above may be modified by skipping steps where the target access nodes are prepared for the link setup, e.g. steps 402 and 406. The validity window(s) of the candidate cell(s) may be transmitted to the terminal device via dedicated signalling such as one or more link (re)configuration messages, for example, before the terminal device enters the idle state. Accordingly, the terminal device may utilize the validity windows for the link setup in the idle state, if the terminal device detects a need for the link setup. The tracking area may include one or more cells. In an embodiment, the terminal device may report its cell selection to the network coordinator, for example. The network coordinator thus stores information on the cell where the terminal device currently camps.

Figure 8:
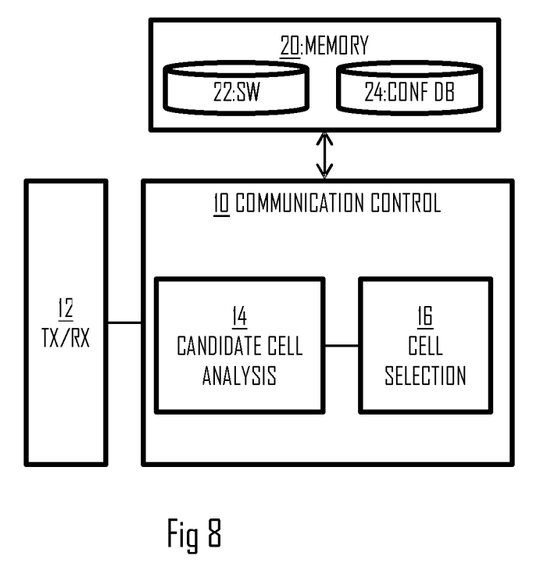
FIGS. 8 and 9 illustrate block diagrams of apparatuses according to some embodiments of the invention.
Figure 9:
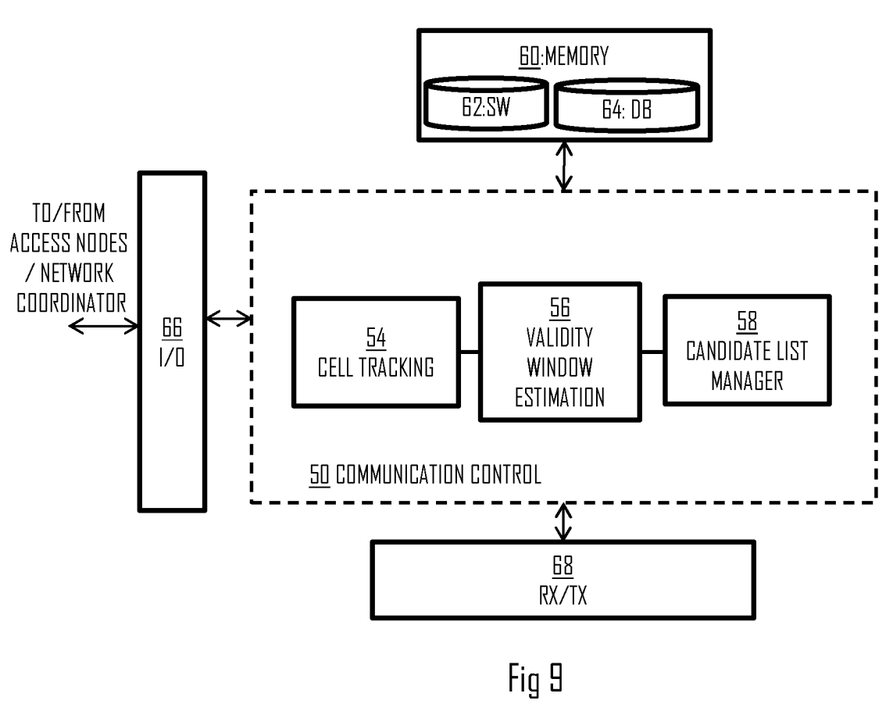

FIGS. 8 and 9 illustrate block diagrams of apparatuses according to some embodiments of the invention. FIG. 8 illustrates an apparatus applicable to the terminal device while FIG. 9 illustrates the network node, e.g. the access node. Above, some features are described for a source access node and other features for a target access node but it should be appreciated that both source and target access node may support all the features. The apparatus of FIG. 8 may be the terminal device, or the apparatus may be comprised in the terminal device. The apparatus may be, for example, a circuitry or a chipset suitable for the terminal device to realize the described embodiments. The apparatus of FIG. 9 may be the network node or be comprised in the network node. The apparatus may be, for example, a circuitry or a chipset applicable to the network node to realize the described embodiments. The apparatuses of FIGS. 8 and 9 may be electronic devices comprising electronic circuitries.

Referring to FIG. 8, the apparatus may comprise a communication control circuitry 10 such as at least one processor, and at least one memory 20 including a computer program code (software) 22 wherein the at least one memory and the computer program code (software) are configured, with the at least one processor, to cause the apparatus to carry out any one of the embodiments of the terminal device described above.

The memory 20 may be implemented using any suitable data storage technology, such as semiconductor based memory devices, flash memory, magnetic memory devices and systems, optical memory devices and systems, fixed memory and removable memory. The memory may comprise a configuration database 24 for storing configuration data for use in the transmissions. For example, the configuration database 24 may store information on a traffic demand of the terminal device, the candidate list including the validity windows, and/or at least the validity window for the selected candidate cell.

The apparatus may further comprise a communication interface (TX/RX) 12 comprising hardware and/or software for realizing communication connectivity according to one or more communication protocols. The communication interface 12 may provide the apparatus with communication capabilities to communicate in a cellular communication system and/or in another wireless network. The communication interface 12 may comprise standard well-known components such as an amplifier, filter, frequency-converter, (de)modulator, and encoder/decoder circuitries and one or more antennas. The communication interface 12 may comprise radio interface components providing the apparatus with radio communication capability in one or more wireless networks.

The communication control circuitry 10 may comprise, as sub-circuitries, a candidate cell analysis circuitry 14 configured to perform steps 506 or 600 and 602, for example. The candidate cell analysis circuitry may analyse the capabilities of the candidate cells provided in the candidate cell list for the selection of the suitable cell for the link setup. Upon completing the analysis, the results may be provided to a cell selection circuitry 16 configured to select one of the candidate cells on the basis of the analysis results. Thereafter, the communication control circuitry 10 may trigger the establishment of a new radio link with the elected candidate cell and, in some embodiments inform a currently serving cell of the selection.

Referring to FIG. 9, the apparatus may comprise a communication control circuitry 50 such as at least one processor, and at least one memory 60 including a computer program code (software) 62 wherein the at least one memory and the computer program code (software) are configured, with the at least one processor, to cause the apparatus to carry out any one of the embodiments of the network node, e.g. the access node described above.

The memory 60 may be implemented using any suitable data storage technology, such as semiconductor based memory devices, flash memory, magnetic memory devices and systems, optical memory devices and systems, fixed memory and removable memory. The memory may comprise a configuration database 64 for storing configuration data. For example, the configuration database 64 may store current neighbour cell list and, in some embodiments, validity windows computed for the detected neighbour cells. The configuration database may also store trajectories of the mobile access nodes registered to the cellular communication system. Such information may enable the network node to determine the timings when the mobile access nodes are so close to the network node that addition of new links to the mobile access nodes is possible for terminal devices served by the network node.

The apparatus may further comprise a communication interface (TX/RX) 68 comprising hardware and/or software for realizing communication connectivity according to one or more communication protocols. The communication interface 68 may provide the apparatus with radio communication capabilities to communicate in the cellular communication system. The communication interface may, for example, provide a radio interface to terminal devices. The apparatus may further comprise another interface 66 towards the core network such as the network coordinator apparatus and/or to the access nodes of the cellular communication system.

Referring to FIG. 9, the communication control circuitry 50 may comprise a cell tracking circuitry 54 configured to track other access nodes and detect access nodes potential for new link addition for the terminal devices served by the network node. The cell tracking circuitry may perform step 400, for example.

Upon the cell tracking circuitry 54 detecting a new cell, provided either by a mobile or a terrestrial access node, the communication control circuitry 50 may cause a validity window estimation circuitry 56 to estimate the validity window for the new cell. The validity window may be calculated by using mobility of the terminal device(s) served by the network node, mobility of the serving access node, and/or mobility of the new cell, as described above. Upon computing the validity window, a candidate list manager circuitry 58 may update a candidate list of one or more terminal devices served by the network node with the new cell and associated validity window. Thereafter, the communication control circuitry 50 may trigger transmission of the updated candidate list over the radio interface, e.g. by using dedicated signalling or broadcast signalling.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device. The above-described embodiments of the circuitry may also be considered as embodiments that provide means for carrying out the embodiments of the methods or processes described in this document.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 2 to 7 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A method comprising:
   receiving, in a terminal device of a cellular communication system, a message from a network node of the cellular communication system, the message comprising at least one information element indicating at least one candidate cell and at least one validity window for the at least one candidate cell, the at least one validity window defining at least one time window when link setup with the at least one candidate cell will be valid for the terminal device;
   selecting, in the terminal device, one of the at least one candidate cell for the link setup; and
   initiating, by the terminal device, the link setup with the selected candidate cell within a validity window associated with the selected candidate cell,
   wherein the at least one candidate cell comprises a plurality of candidate cells; and the method further comprises:
   comparing by the terminal device validity windows of the plurality of candidate cells and wherein said selecting is on a basis of the comparison.

2. The method of claim 1, further comprising: performing the selection before the validity window associated with the selected candidate cell starts.

3. The method of claim 1, further comprising: performing the selection after the validity window associated with the selected candidate cell has started.

4. The method of claim 1, further comprising:
   measuring, by the terminal device a reference signal received from each of the plurality of candidate cells; and using the measurements in the comparison.

5. The method of claim 1, further comprising:
   selecting, by the terminal device according to at least one determined criterion, a particular time instance for the triggering the link setup within the validity window associated with the selected candidate cell, wherein the at least one criterion is based on measurements made by the terminal device or a state of the terminal device.

6. An apparatus, comprising:
   at least one processor, and
   at least one non-transitory memory including a computer program code, wherein the at least one non-transitory memory and the computer program code are configured, with the at least one processor, to cause the apparatus to:
   select for a terminal device of a cellular communication system, at least one candidate cell for link setup;
   determine at least one validity window for the at least one candidate cell, the at least one validity window defining at least one time window when the link setup with the at least one candidate cell will be valid for the terminal device; and
   cause transmission of a message to the terminal device, the message comprising at least one information element indicating the at least one candidate cell and a corresponding validity window for the terminal device to select for link setup based on a comparison of the at least one validity window.

7. The apparatus of claim 6, wherein the at least one non-transitory memory and the computer program code are configured, with the at least one processor, to cause the apparatus to:
   determine the at least one validity window on the basis of the mobility of the terminal device.

8. The apparatus of claim 7, wherein the mobility comprises at least one of direction of movement, location and velocity.

9. The apparatus of claim 6, wherein at least one of the apparatus and the at least one candidate cell is mobile, and wherein the at least one non-transitory memory and the computer program code are configured, with the at least one processor, to cause the apparatus to:
   determine the at least one validity window for the at least one candidate cell on the basis of the mobility of the at least one of the apparatus and the at least one candidate cell.

10. The apparatus of claim 6, wherein the at least one non-transitory memory and the computer program code are configured, with the at least one processor, to cause the apparatus to:
    transfer, before transmitting the message to the terminal device, at least one current connection parameter of the terminal device to the at least one candidate cell to prepare the at least one candidate cell for the link setup.

11. The apparatus of claim 6, wherein the at least one non-transitory memory and the computer program code are configured, with the at least one processor, to cause the apparatus to:
    receive a message comprising at least one information element indicating which one of the at least one candidate cell the terminal device selected for the link setup.

12. The apparatus of claim 6, wherein the at least one non-transitory memory and the computer program code are configured, with the at least one processor, to cause the apparatus to:
    verify, before selecting the at least one candidate cell, whether or not the at least one candidate cell is prepared for the link setup.

13. The apparatus of claim 6, wherein the message is a handover command or a command for setting up an additional radio link for the terminal device.

14. An apparatus, comprising:
    at least one processor, and
    at least one non-transitory memory including a computer program code, wherein the at least one non-transitory memory and the computer program code are configured, with the at least one processor, to cause the apparatus to:
    receive a message from a network node of a cellular communication system, the message comprising at least one information element indicating at least one candidate cell and at least one validity window for the at least one candidate cell, the at least one validity window defining at least one time window when link setup with the cell will be valid for the apparatus;

select one of the at least one candidate cell for the link setup; and initiate the link setup with the selected candidate cell within a validity window associated with the selected candidate cell, wherein the at least one candidate cell comprises a plurality of candidate cells; and the apparatus is further caused to:

compare validity windows of the plurality of candidate cells and wherein said selecting is on a basis of the comparison.

15. The apparatus of claim 14, wherein the at least one non-transitory memory and the computer program code are configured, with the at least one processor, to cause the apparatus to:

perform the selection before the validity window associated with the selected candidate cell starts.

16. The apparatus of claim 14, wherein the at least one non-transitory memory and the computer program code are configured, with the at least one processor, to cause the apparatus to:

perform the selection after the validity window associated with the selected candidate cell has started.

17. The apparatus of claim 14, wherein the at least one non-transitory memory and the computer program code are configured, with the at least one processor, to cause the apparatus to:

measure a reference signal received from each of the plurality of candidate cells and to use the measurements in the comparison.

18. The apparatus of claim 14, wherein the at least one non-transitory memory and the computer program code are configured, with the at least one processor, to cause the apparatus to:

select, according to at least one determined criterion, a particular time instance for the triggering the link setup within the validity window associated with the selected candidate cell, wherein the at least one criterion is based on measurements or a state of the apparatus.

* * * * *